Aug. 15, 1944.   O. V. CARDINAL   2,355,781
UNIVERSAL JOINT AND RODDING AND METHOD OF MAKING
Filed Aug. 3, 1940
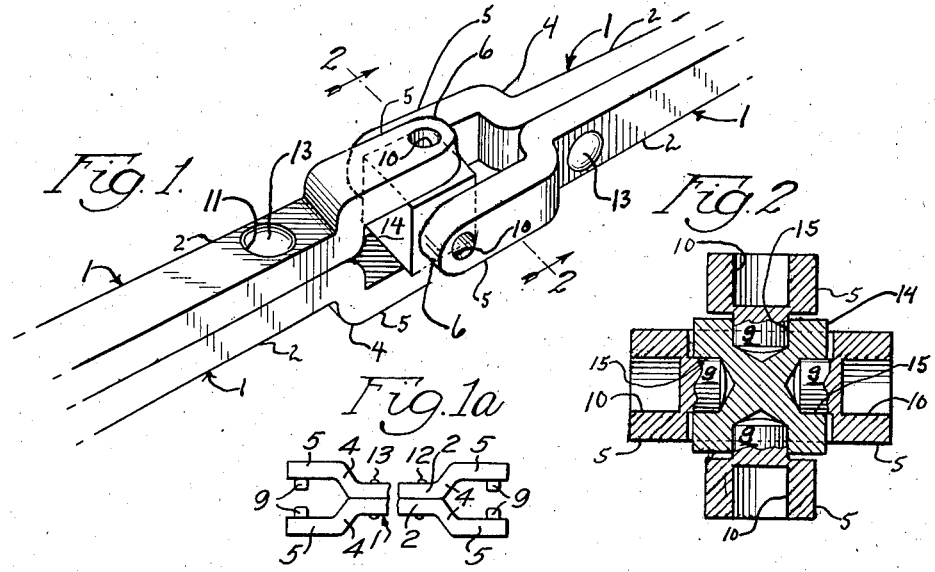
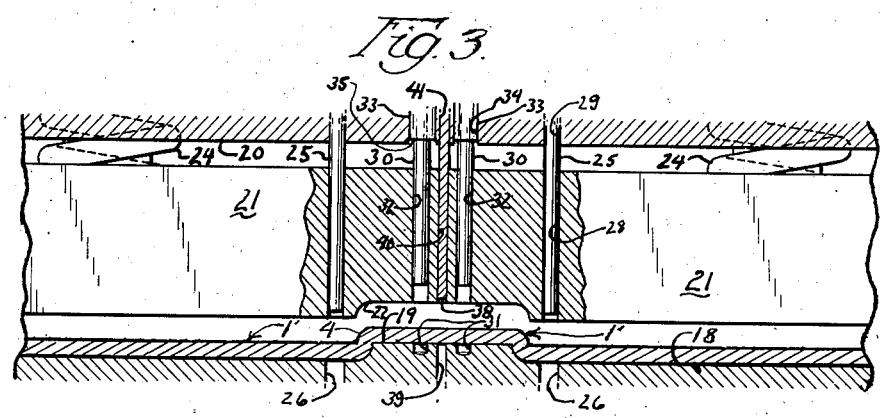
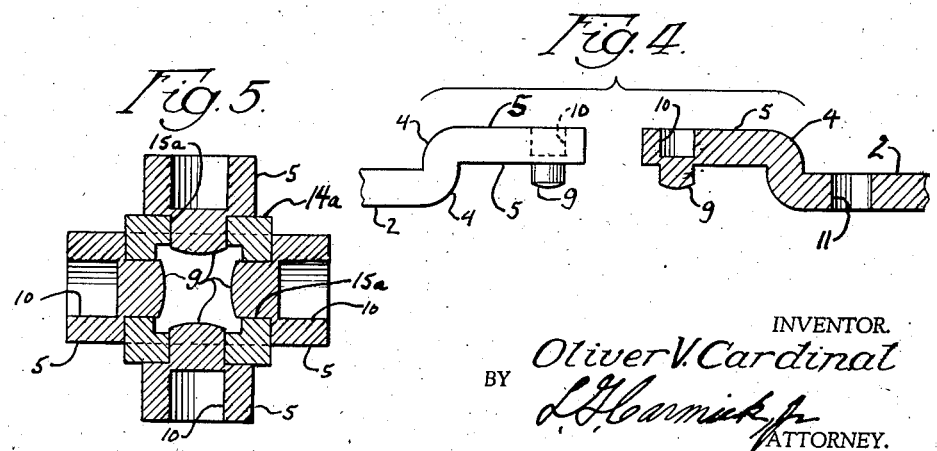
INVENTOR.
Oliver V. Cardinal
BY
ATTORNEY.

Patented Aug. 15, 1944

2,355,781

UNITED STATES PATENT OFFICE 2,355,781

UNIVERSAL JOINT AND RODDING AND METHOD OF MAKING

Oliver V. Cardinal, Detroit, Mich., assignor to Evans Products Company, Detroit, Mich., a corporation of Delaware Application August 3, 1940, Serial No. 350,884

17 Claims. (Cl. 29—148)

This invention relates to pivotal joints, lengths of rod or the like combined with pivotal joints, and to the method of making the same or other articles. Particularly, this invention relates to a light and cheap, but satisfactory, universal joint of the Hooke's type combined with rodding lengths, and to a closely related method for making the same.

Heretofore, pivotal joints, particularly universal joints such as the Hooke's joint, have been formed or manufactured separately from the shafts, rod lengths, or the like, between which they are later fixed or connected. That is, such jointed shaft sections or lengths generally have been made by suitably connecting to the shaft ends fittings forming a yoke, or the like, which are connected to an intermediate member by trunnions or pivot pins received in suitable bearing openings with the trunnions or pins usually being separate pins fixed to the intermediate member or to the yoke or fork members; and the methods of forming these joints or the combined rod or shaft lengths and joints have been as indicated above. It will be apparent that such joints and methods necessitate forming, handling, and assembling a relatively large number of pieces. Particularly where intended for light duty service, or for such uses as joined control rods, or the like, where heavy loads or excessive wear are not encountered, such joints, combined rod lengths and joints, and methods as outlined above have been quite expensive, have required more metal (and hence have had greater weight), and generally have been rather complicated.

Accordingly, the objects of my invention are to provide an improved, cheap, light, pivotal joint (particularly such a joint of the Hooke's type), to provide a simple, cheap, unitary combination of rod or shaft lengths with a pivotal joint, and to provide a cheap and simple method for making the above joints or combined joints and rods, or other articles.

The several features and advantages of my invention and the manner in which it is to be practiced, are set forth in the following specification which describes particularly one preferred embodiment of my invention shown in the accompanying drawings, wherein like or similar reference characters are used to refer to the same or related parts in the drawing.

In the drawing:

Fig. 1 shows the ends of two lengths of rodding (to be employed, for example, as a control shaft line or the like) interconnected by a Hooke's type joint;

Fig. 1a shows a complete rod or shafting unit length with its integral universal joint fork portions at each end and with the center portion of the shafting broken away to reduce the length.

Fig. 2 is a section taken on the line 2—2 of Fig. 1;

Fig. 3 is a rather schematic or general section taken through a portion of the dies for forming my combined pivotal joint and rod lengths;

Fig. 4 shows the pivot-carrying, bent or offset ends of two strips, one being shown in elevation and the other in longitudinal section; and Fig. 5 is a sectional view similar similar to Fig. 2 but showing a modified form of intermediate member.

Referring particularly to Figs. 1, 2 and 4 showing in detail the present preferred embodiment of my new article of manufacture, it will be seen that a pair of elongated members, such as the steel strips generally indicated by 1, are formed with intermediate portions 2 which, in this instance, are straight although it will be understood that they may be curved or in other forms desired for particular uses. The strips 1 are bent adjacent their ends, as indicated by the bends 4, to form a relatively short offset yoke or fork arm forming portion 5 which may be in various forms, such as the short straight length shown in this particular embodiment. The ends of these portions 5 are preferably rounded or cut away, as shown at 6, to increase the possible angularity of this Hooke's type joint, as is known in this art. Each strip or member 1 carries on its fork arm portion 5 in a suitable position at, or adjacent, its end, an integral trunnion or pivot pin for the joint, with these pins extending toward the main or intermediate portion 2 of the strip 1, as shown. As explained more fully in connection with the closely related method of forming this combined joint and rod sections, the pin or trunnion 9 is integral with portion 5 and is thus integrally formed by deforming the metal portion 5, preferably by an extruding or punching operation whereby the metal to form the trunnion 9 is forced out from the space shown by the opening 10 by an extruding punch, or the like, in the manner described in detail below.

The intermediate member or block 14 has four similar holes or bearing openings 15 formed to receive the trunnions 9 with an easy working fit and to a suitable depth for the strength required for the particular service for which the joint and rodding is made.

It will be apparent that the general organization and general operation are those of the well-known Hooke's joint, and hence need not be further described.

As shown in Fig. 1, the pair of strips 1 with forked or offset and pin-carrying ends are assembled as shown with their pins 9 in the corresponding openings of the member 14, and the lengths or strips are then suitably secured together to thus hold the pins against removal from their bearing openings 15 and to unite the pair of strips 1 into a single or unitary or more rigid length of rodding or shafting.

Although various fastening means, including welding, bent-over tangs, and other known expedients, may be employed, for the particular service for which this preferred embodiment is used, I prefer to rivet the sections together by a number of suitably spaced rivets 13 passing through the corresponding holes 11. An advantage of the use of rivets here is that the light (about 1/8" thick stock) strips of steel are not weakened as they would be by welding of such light metal. Another advantage is that the rivet holes may be very readily formed in the same dies and during the same stamping operations used to form the forks and trunnions on the strips, as described below.

Instead of intermediate member 14 being formed by drilling the holes 15 in solid stock and cutting it into lengths, as shown in Figs. 1 and 2, this intermediate member may be formed as shown in Fig. 5, wherein the length of hollow, rectangular, or—within the purview of this invention—circular or other cross sectional stock may have the holes 15a punched or pierced instead of being drilled, and is then cut into short lengths to form the blocks 14a. As will be seen, the other elements in Fig. 5 are the same as those in Fig. 2 and carry the same reference characters.

Referring again to Fig. 1, it will be apparent that a chain of any desired number of shaft or rod sections of any desired or suitable lengths (note that the sections may be of different lengths if desired) may be pivotally joined together by a number of joints of the type illustrated. The lengths of section of rodding at the ends of the chain may have forked portions 5 formed only at one end thereof, or at their inner ends if it is desired to use some other securing means for the outer ends of these end sections; while the intermediate lengths of the rodding of this chain may have forked portions 5 formed at both ends thereof. It will also be understood that the yoke or fork-arm portions 5 at one end of a length or section may also be employed for connecting to a member to be operated or an actuating member by a single axis, pivotal joint instead of the double axis joint of the Hooke's type. This single axis, pivotal joint, for example, may be employed in connecting such a chain of jointed rodding lengths to a rotary member to be operated, such as a fuel control valve or the like, particularly where the last length lies at an angle to the axis of rotation of the valve.

Although not shown in Fig. 1 in order to save unnecessary illustration, it will be apparent that a suitable number of holes 11 and the corresponding rivets 13 may be spaced along the rodding lengths formed by the two strips 1, and that these holes may be punched out by additional piercing punches formed in the die organization described below, as will be well understood in this art.

It should be particularly noted that the yoke or fork-forming arm portions 5 are integral with and are formed by deforming the metal of the strip 1. Thus some of the advantages of my invention may be obtained even though the pivot pins or trunnions 9 are not integral with the portions 5, as shown. In fact, within the broader purview of my invention, the trunnions 9 may be carried by the intermediate member 14 and received in drilled or pierce-punched bearing openings formed in the portions 5, as will be well understood by those skilled in this art.

However, in order to fully realize the economies and advantages of this invention, it is preferred that the pivot pins or trunnions be integrally formed from the metal of the fork arms 5 by deforming the same by bending, or the like, or, specifically, by a punching type of extrusion as described in detail herein. It may be noted that I have contemplated, and consider to be within the purview of my invention, forming the pivot pins, such as 9, by bending inwardly the ends of offset or fork-arm portion, such as 5, which are part of portions 1 which may be formed by round steel wire, or the like. The two lengths of steel wire are spot welded or otherwise secured together to thus complete the joint, to hold the pins in their bearings, and to form a more rigid rodding length.

In order to save what is believed to be needlessly complicated drawing and description in view of the highly developed state of the stamping and die punching art, I have indicated only a part of the apparatus for forming the completed strips 1 by the rather general or schematic view of Fig. 3. This figure is intended to represent that part of a multiple progressive die organization used for forming the second stage or operation, as will be apparent from the following description.

The lower half of the die 18 has a raised locater portion 19 having its ends curved to correspond to the bend 4 in the length of strip stock 1' shown in the die and which has been previously bent to form the bends 4 and the two portions 5 which have not yet been severed and have the rounded ends 6 formed thereon. The nature of the upper half or die shoe 20 and the stripper pad 21 will be well understood by workers skilled in this art. The stripper pad 21 carries a reversely formed locater portion 22 with curved ends corresponding to the other side or bend 4 in the partly formed rod section 1'. The pressure pad springs 24 act between 20 and 21 on suitable guide pins, or the like.

A number of conventional piercing punches, two of which are shown at 25, may be spaced along the lengths of the strips 1. The lower die half 18 has openings 26 of larger diameter than the diameter of the working end of the punch 25, so that 25 will operate to shear the metal or as a piercing punch, as is known in the art. Openings 26 are in a position to receive the ends of piercing punches 25, and the piercing punches 25 are slidable in corresponding openings 28 in the body 21 and are fixed in openings 29 in body 20.

A pair of extruding punches are shown at 30, their correspondingly positioned openings or recesses 31 being formed in the lower die half 18 to receive the metal which is extruded or pushed out by the punches 30. As will be understood, the shape of the pins 9 is determined by the shape of the recesses 31. It should be noted that the diameter of the circular recesses 31 is the same, or very nearly the same, as the diameter of the working end of the extruding punch 30 so that the punches 30 will not operate as piercing punches to shear the metal of the strip 1' but will flow it or extrude it into the recesses 31 without weakening the connecting portions between pins 9 and portions 5.

The thickness of metal remaining to integrally connect pins 9 to the portions 5 is determined by the distance or depth at which punches 30 are allowed to operate, and means to suitably limit the travel of punches 30. The proper travel is determined by the distance between the upper surface of 21 and the lower surface of 20 (the members 20 and 21 being normally held apart by springs 24) and the length of punches 30 from the under surface of 20 and the effective thickness of the member 21.

As will be seen, the punches 30 are slidable in corresponding openings 32 formed in the body 21, and the enlarged portions 33 or shoulders 35 of the punches are fixed in the corresponding openings 34 formed in the body 20.

The severing or cut-off punch plate 38 is slidable in a correspondingly shaped slot or opening 40 in the body 21 and in the correspondingly shaped slot or opening 41 in the body 20.

As will be readily apparent, the sides of the cut-off punch plate 38 are curved or formed to cut the partially formed strip 1' with the curved ends, as shown at 6 in Fig. 1.

As mentioned above, the apparatus somewhat schematically shown in Fig. 3 is part of a multiple progressive die of the generally conventional type wherein the two stages or stations operate every time the press comes down. Thus the first station (not shown), wherein the die portions are shaped like the locater die portions shown in Fig. 3, forms the bent or embossed portions 4 and 5 in the continuous or suitable length of strip, and the second station simultaneously acts upon the intermediate portions 2 and the bent or embossed portions 4 and 5 to thus simultaneously pierce, extrude, and sever by the punches 25, 30 and 38, respectively. The strip stock is moved over to the right between each operation of the press.

It may be mentioned that the preferred article has been made by the above-described process and extensively used commercially with entire satisfaction. In this instance, a chain of several lengths, each about 2 feet long and connected by universal joints as shown, was made up of 1/8" thick strip steel, the block portions 14 being drilled and cut off from 3/8" key stock. Many thousands of such shafting chains have been used for the remote manual control of the rotary fuel regulating valves in oil burning space heaters. The total cost of the shaft chain was less than one-half of the cost of the cheapest usable chain of rods and joints otherwise available. It has been found that when the pivots A are purposely broken off by a hard blow, they always shear off across the solid metal and do not pull away through the relatively thin metal connection, which is about 1/64" thick or about one-eighth of the thickness of the strip. The pivots 9 thus formed appear to be as strong and as strongly secured as an equivalent sized rivet set in a hole through the portion 5. This shafting so formed has a large angularity, that is, the sections can be set at a large angle to each other. In general, this jointed shafting has been found to have satisfactory wearing ability, low friction, etc.

It is to be understood that the specific article and method described above are to be taken as preferred examples of the invention and that variations therefrom may be employed within the spirit and teachings of this invention, the scope of which is commensurate with the appended claims.

I claim:

1. The method of making unitary, universally jointed rodding including an integrally combined pivotal joint and length of rodding comprising the steps of embossing a bent, short, offset portion in a length of strip metal stock at the first station of a progressive multiple die and simultaneously forming on the offset portion formed by the previous press operation an integrally-united projecting pivot pin by an extrusion punch, severing said offset portion by a cut-off punch, piercing rivet holes through the remaining length of said strip length by piercing punches, all of said punches being located at the second station of said progressive multiple die, providing a member having opposed bearing openings for said pivot pins, and then assembling and riveting together through said rivet holes pairs of such formed strip lengths in flatwise, side-by-side position with their pivot pins thus held in said bearing openings.

2. The method of making unitary, pivotally jointed rodding including metal rod lengths with a Hooke's type joint therebetween and partly integral therewith comprising the steps of; forming an intermediate member with trunnion-receiving openings therein, deforming the metal of the ends of long flat metal strips between dies to form integral trunnions thereon, bending fork-arm portions to carry said trunnions on said metal strips, cutting said strips into rod lengths, said last four steps being in any desired order and all performed in a progressive multiple die, and then assembling and securing together pairs of such forked ended strips with their trunnions thus held in said openings.

3. The sub-combination method of making a length of strip for a unitary, pivotally jointed rodding having a length of rodding integral and in one piece with a yoke portion and a pivot pin thereon comprising the steps of embossing a bent, short, offset, yoke-forming portion in a length of strip metal stock at the first station of a progressive multiple die and simultaneously forming on the offset portion formed by the previous press operation an integrally-united, projecting pivot pin by an extrusion punch at the second station of said progressive multiple die.

4. The method of making a length of strip for a unitary, pivotally jointed rodding having a pivotal joint in part integral with a length of rodding comprising the steps of embossing a bent, short, offset, yoke-forming portion in a length of strip metal stock at the first station of a progressive multiple die and simultaneously forming on the offset portion formed by the previous press operation an integrally-united, projecting pivot pin by an extrusion punch, severing said offset portion by a cut-off punch, and piercing rivet holes through the remaining length of said strip length by piercing punches, all of said punches being located at the second station of said progressive multiple die.

5. As an improved article of manufacture, a light, unitary, jointed rodding having complete length units of rodding with portions of a Hooke's type universal joint integral therewith, each length unit consisting only of two flat, metal strips as long as a complete rod length unit, said strips being secured together in overlying flatwise relation to form a complete shaft length and each strip having offset, integral ends thus held and secured to form a rigid fork at each end thereof, intermediate members, and means including pivot trunnions and journal openings therefor pivotally connecting said intermediate members between the integral forks at each end of each of said lengths of rodding.

6. The method of making unitary pivotally jointed rodding having a complete length of rodding integral with part of a Hooke's type of universal joint comprising bending the ends of a pair of identical lengths of metal substantially as long as a complete length of rodding to form short, off-set fork arm ends, deforming the metal of said ends between dies to form integral, inwardly projecting pivots, providing a member with opposed bearing holes for said pivots, then assembling said pair of lengths together in side by side position with their bent ends forming a fork and with their integral pivots in the said bearing holes, and then securing together said pair of lengths while thus assembled to form the rod unit and also to thus form the fork and hold its pivots in the bearing holes.

7. The method of making two complete shaft lengths with a Hooke's type universal joint between them comprising forming an integral interconnecting part with two opposed pairs of pivot type bearing forming portions, severing strip metal into two pairs of lengths each substantially as long as one of the complete shaft lengths, bending at least one end of each length of metal to form an integral, off-set, parallel, fork forming portion, forming integral complemental interfitting pivot type bearing forming portions on each such off-set portion, then assembling the two pairs of such lengths of metal in side by side contact with the off-set end portions of each pair forming a yoke embracing said intermediate member and with the complemental pivot bearing forming portions interfitting, and then permanently securing together said side by side contacting lengths to form the two complete unitary lengths of rodding and their integral yokes and also to permanently hold said yokes on said interconnecting part with the complemental pivot bearing forming portions non-removably interfitting.

8. The method of making a complete length of shafting having integral parts Hooke's type universal joints at each end thereof consisting in bending each end of each of a pair of similar lengths of metal each substantially as long as the complete length of shafting to form short, parallel, off-set, fork forming portions, forming integral pivot type bearing forming portions on each said fork forming portion, providing the rest of the two universal joints including two interconnecting parts each having opposed pairs of integral pivot bearing forming portions complemental to said first mentioned bearing portions, then assembling said pair of lengths side by side with the opposite off-set ends forming forks embracing said two interconnecting parts and with the two sets of complemental bearing portions interfitted, and then securing together said two lengths of metal at spaced points to form a unitary complete length of shafting with its two integral end forks thus secured and permanently held pivotally connected to the interconnecting portions.

9. The method of making light duty Hooke's type universal joints consisting in forming two yokes each of a pair of off-set, fork arm forming pieces of otherwise flat steel strip, deforming the metal of each said flat fork end by punching between dies to form an extruded pivot pin connected to its fork arm by a thin but strong, worked or deformed region of metal, and then assembling and securing together said pairs of pieces to form the two yokes embracing, and with their integral pivot pins thus held in, the opposed pairs of journal holes of an interconnecting member.

10. Universally jointed rodding comprising, in combination, lengths of rodding with a Hooke's type universal joint therebetween, each length comprising a pair of light, uniform metal strips, each substantially as long as a complete length unit of rodding and each having an integral offset end to form a rigid fork and an inwardly extending integral pivot pin thereon, an intermediate member having bearing openings for said pivots, the strips of said pairs being secured directly together flatwise and in side by side relation to form complete lengths of rodding and to hold the integral pivots in said bearing openings.

11. Universally jointed shafting wherein a universal joint is in part integral with a complete shaft length unit comprising a pair of steel strips as long as a complete shaft length unit, each having spaced centrally positioned rivet holes therethrough and each having an off-set, fork arm forming end integral with and of the same thickness as the strip and connected thereto by a stronger portion of the same strip metal, inwardly projecting solid integral pivot pins on said ends connected by a stronger but thin region of the same strip metal, means having opposed bearing openings for said pivots, and rivets through said rivet holes securing said pair of lengths directly together in flatwise relation to form a complete rodding length and integral joint portion with its integral pivots thus held in said bearing openings.

12. As an improved article of manufacture, a light, unitary, jointed shafting having complete shaft length units with portions of a Hooke's type universal joint integral therewith, each length unit consisting only of two long, flat strips secured directly together in overlying flatwise relation and each having its two integral ends off-set and thus held and secured to form a rigid fork at each end, intermediate members, and means including pivot trunnions and journal openings therefor pivotally connecting said intermediate members between the integral end forks of said complete unit length of rodding.

13. A unitary jointed rodding comprising, in combination, jointed lengths of rodding, one of said lengths consisting of two flat metal strips each as long as a complete rodding length and each having an integral, fork arm forming, end portion, an integral, solid pivot trunnion adjacent the end of each fork arm forming the only pivot pins, means carried by an adjacent length of rodding and having bearing openings for said trunnions, and means securing said strips directly together side by side to form a complete unitary length of rodding having an integral forked end with its integral trunnions thus held and secured in said bearing openings and thus eliminating any securing means between the length of rodding and its fork ends, any pivot securing means, or any means to secure the fork to a rod or shaft.

14. As a sub-combination article of manufacture, a combined shaft length portion and joint portion for a universally jointed rodding having a part of its pivotal joint integral with a complete length unit of rodding and comprising a steel strip as long as a complete length unit of rodding, a short, off-set integral fork arm forming portion at each end thereof connected by a uniform size portion of the strip stronger than the same metal of the major part of the strip and a laterally projecting, integral, solid pivot pin on each said off-set strip portion connected thereto by a thin annular region of metal stronger than the same metal of the major part of the strip.

15. As a sub-combination article of manufacture, a length of strip for universally jointed rodding comprising a uniform, light, flat metal strip as long as, and to form a part of, a complete length unit of jointed rodding, a short, off-set integral portion of the uniform strip at each end thereof, and a laterally projecting, integral, solid pivot pin on each of said off-set end portions of the strip strongly connected thereto by an annular region of the metal and there being a round recess in the strip behind each said solid integral pivot pin.

16. As a sub-combination article of manufacture, a length of metal having a flat side to be assembled side by side with a similar length with the flat sides of the two lengths in contact with each other to form a unitary complete length of shafting and comprising a substantially straight intermediate portion, short integral, fork forming portions offset in the same direction at each end thereof, and each having a short end portion substantially parallel with said intermediate portion, and a pivot pin integral with and projecting transversely from the flat side of each said short end portions in the opposite direction to said offsets.

17. As an article of manufacture for use in universally jointed rodding, a complete length unit of rodding and a part of a universally pivoted joint integral therewith comprising two similar lengths of metal of the same length as said unit of rodding and each having one flat side and a substantially straight long intermediate portion, an integral fork forming part including a short offset portion at one end of each of said lengths substantially parallel with said intermediate portion, and a pivot pin integral with and projecting transversely from said offset portion in the opposite direction to said offset, an inner member having opposed bearing openings therein, and means securing together said substantially straight intermediate portions in coextensive side by side relation with the flat sides together to form said length unit with said fork embracing said inner member and said integral pivot pins inwardly directed and thus secured in place in said bearing openings.

OLIVER V. CARDINAL.